US011734899B2

(12) United States Patent
Ng et al.

(10) Patent No.: US 11,734,899 B2
(45) Date of Patent: *Aug. 22, 2023

(54) HEADSET-BASED INTERFACE AND MENU SYSTEM

(71) Applicant: SPATIAL SYSTEMS INC., New York, NY (US)

(72) Inventors: Peter Ng, San Francisco, CA (US); Jinha Lee, New York, NY (US); Anand Agarawala, New York, NY (US)

(73) Assignee: SPATIAL SYSTEMS INC., New York, NY (US)

( * ) Notice: Subject to any disclaimer, the term of this patent is extended or adjusted under 35 U.S.C. 154(b) by 30 days.

This patent is subject to a terminal disclaimer.

(21) Appl. No.: 17/470,505

(22) Filed: Sep. 9, 2021

(65) Prior Publication Data
US 2022/0068032 A1 Mar. 3, 2022

Related U.S. Application Data

(63) Continuation of application No. 17/007,784, filed on Aug. 31, 2020, now Pat. No. 11,145,135.
(Continued)

(51) Int. Cl.
G06T 19/00 (2011.01)
G06F 3/04817 (2022.01)
(Continued)

(52) U.S. Cl.
CPC ............ G06T 19/006 (2013.01); G06F 3/017 (2013.01); G06F 3/0482 (2013.01);
(Continued)

(58) Field of Classification Search
CPC .... G06F 3/017; G06F 3/04817; G06F 3/0482; G06T 19/006
See application file for complete search history.

(56) References Cited

U.S. PATENT DOCUMENTS 11,145,135 B1   10/2021 Ng et al.
11,232,640 B2    1/2022 Lee et al.
(Continued)

OTHER PUBLICATIONS

Streambim, "StreamBIM Measurement", YouTube video posted on Dec. 18, 2018. Https://www. you tu be .com/watch ?v=iAKBmkm83k (Year: 2018).
(Continued)

Primary Examiner — Charles Tseng
(74) Attorney, Agent, or Firm — Sterne, Kessler, Goldstein & Fox P.L.L.C.

(57) ABSTRACT

Disclosed herein are various embodiments for a headset-based interface and menu system. An embodiment operates by determining a first position of a headset, configured to display and enable interactions with an interface of a computing system, is less than a threshold. A second position of the headset is detected and it is determined that the second position of the headset is greater than the threshold. Responsive to the determining that the second position of the headset is greater than the threshold, a menu is provided for display in the interface visible via the headset overlaying the interface.

17 Claims, 15 Drawing Sheets

Related U.S. Application Data

(60) Provisional application No. 63/016,689, filed on Apr. 28, 2020.

(51) Int. Cl.
  *G06F 3/0482* (2013.01)
  *G06F 3/01* (2006.01)
  *G06T 19/20* (2011.01)

(52) U.S. Cl.
  CPC .......... *G06F 3/04817* (2013.01); *G06T 19/20* (2013.01); *G06T 2200/24* (2013.01); *G06T 2219/004* (2013.01); *G06T 2219/012* (2013.01); *G06T 2219/2016* (2013.01)

(56) References Cited

U.S. PATENT DOCUMENTS

| | | |
|---|---|---|
| 2013/0215235 A1 | 8/2013 | Russell |
| 2015/0022551 A1 | 1/2015 | Kim et al. |
| 2015/0215351 A1 | 7/2015 | Barzuza et al. |
| 2016/0225192 A1* | 8/2016 | Jones ............. G06F 3/012 |
| 2016/0381323 A1 | 12/2016 | Garcia et al. |
| 2018/0284962 A1 | 10/2018 | Ballard et al. |
| 2018/0330542 A1 | 11/2018 | Bharti et al. |
| 2019/0130649 A1 | 5/2019 | O'Brien et al. |
| 2019/0228589 A1 | 7/2019 | Dascola et al. |
| 2019/0279424 A1* | 9/2019 | Clausen ............. G06F 3/017 |
| 2020/0312029 A1 | 10/2020 | Heinen et al. |
| 2021/0335043 A1 | 10/2021 | Ng et al. |
| 2021/0335044 A1 | 10/2021 | Lee et al. |

OTHER PUBLICATIONS

International Search Report and Written Opnion directed to related Application No. PCT/US2021/029405, dated Sep. 16, 2021; 10 pages.

International Preliminary Report on Patentability directed to related Application No. PCT/US2021/029405, dated Oct. 27, 2022; 7 pages.

* cited by examiner

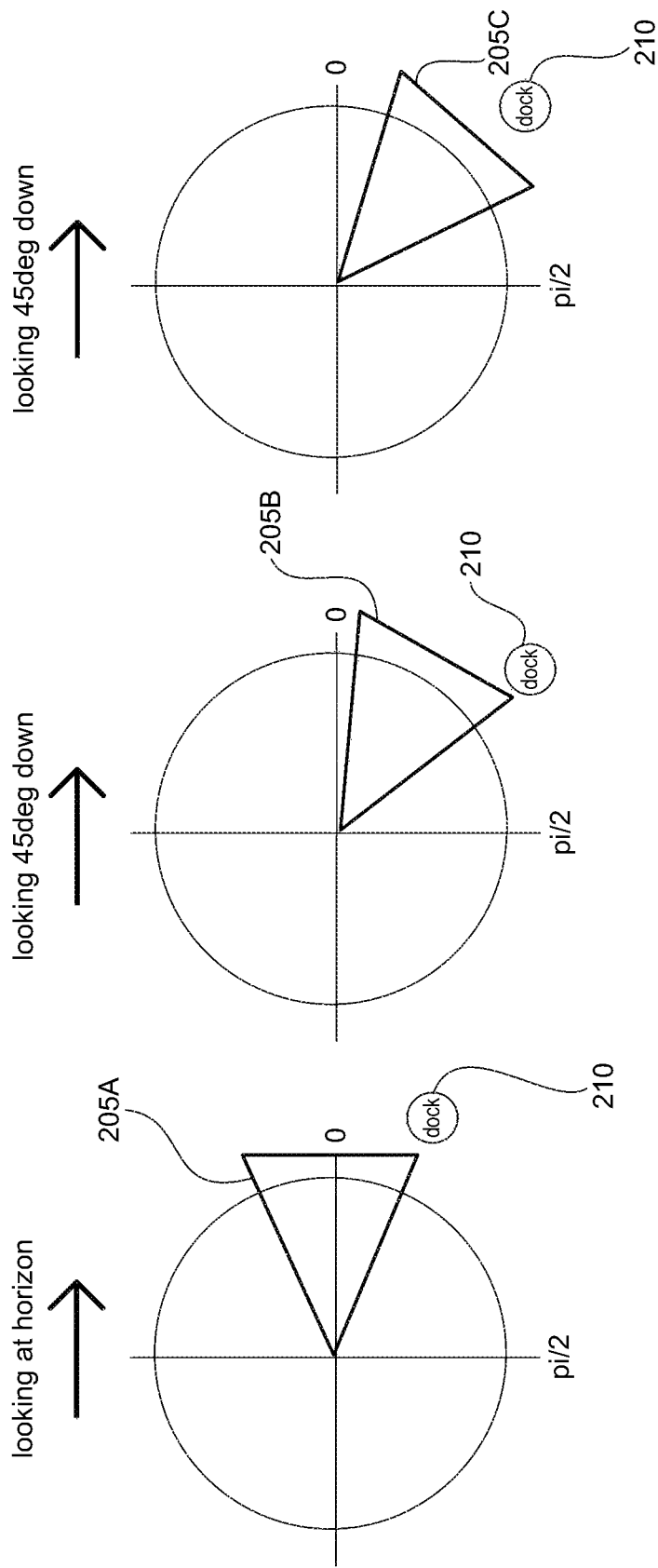

HEADSET-BASED INTERFACE AND MENU SYSTEM

CROSS-REFERENCE TO RELATED APPLICATION

This application is a continuation of patent application Ser. No. 17/007,784, titled "Augmented Reality and Contextual Menu System" to Ng et al. (Atty Docket 4180.0100001), filed on Aug. 31, 2020, which claims priority to U.S. Provisional Patent Application No. 63/016,689, titled "Augmented Reality Interaction System" to Ng et al., filed on Apr. 28, 2020, both of which are herein incorporated by reference in their entireties.

This application is related to U.S. patent application Ser. No. 17/007,817, titled "Augmented Reality Interaction, Modeling, and Annotation System" to Ng et al. (Atty Docket 4180.0110001), filed herewith, which is herein incorporated by reference in its entirety.

BACKGROUND

Augmented reality is widely considered the future of computing. Augmented reality (AR) is a direct or indirect live view of a physical, real-world environment whose elements are 'augmented' by computer-generated perceptual information, ideally across one or more sensory modalities, including visual, auditory, haptic, somatosensory, and olfactory. The overload sensory AR information can be constructive (adding to the physical environment) or destructive (masking portions of the physical environment). AR may alter or augment a user's current perception of a real-world environment, whereas virtual reality (VR) replaces the real-world environment with a simulated one.

BRIEF DESCRIPTION OF THE DRAWINGS

The accompanying drawings are incorporated herein and form a part of the specification.

FIGS. 2A-2C illustrate examples of how the menu dock 210 may be displayed within a user's field of vision, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Augmented reality (AR) is a direct or indirect live view of a physical, real-world environment whose elements are 'augmented' by computer-generated perceptual information, ideally across one or more sensory modalities, including visual, auditory, haptic, somatosensory, and olfactory. The overload sensory AR information can be constructive (adding to the physical environment) or destructive (masking portions of the physical environment). AR may alter or augment a user's current perception of a real-world environment, whereas virtual reality (VR) replaces the real-world environment with a simulated one.

Figure 1A:
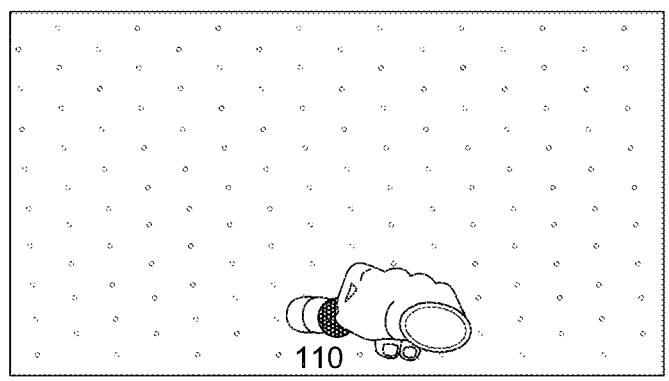
FIGS. 1A-1C illustrate functionality of a contextual menu system, according to some example embodiments.
Figure 1B:
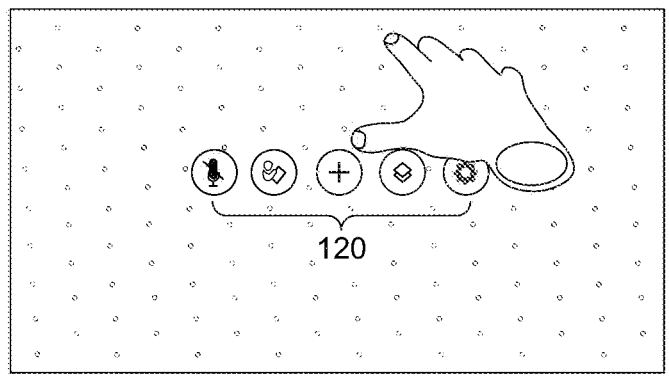
Figure 1C:
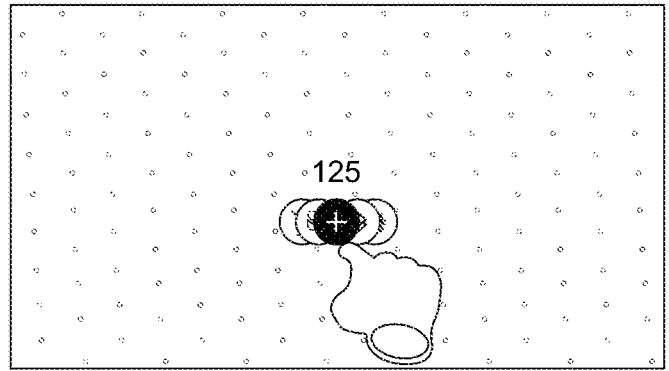

FIGS. 1A-1C illustrate functionality of a contextual menu system, according to some example embodiments.

FIG. 1A illustrates an example functionality of a collapsed or condensed menu within an AR (augmented reality) system interface. An augmented reality (AR) or virtual reality (VR) system enables a user to interact with objects in a simulated three dimensional computing environment. An AR system may be a type of holographic computing environment. As used herein, AR and VR systems will be used interchangeably and may generally be referred to as an AR system.

In an embodiment, a user may use a computing headset, computing glasses, or a mobile device (e.g., phone, tablet, or laptop) or other computing device to engage and interact or interface with the components of an AR system. In an embodiment, the AR system may have access to a menu system that enables a user to activate and/or navigate through various AR system functionality.

In an embodiment, an AR menu system may always be accessible to the user. However the challenge is maintaining the accessibility of the AR menu system, while not obstructing the user's view or interaction and engagement with other virtual objects within the AR environment while using the AR system. FIG. 1A illustrates an example of a collapsed, condensed, or minimized menu system, as represented by an icon 110, in an AR environment.

As illustrated in FIG. 1A, a collapsed or expandable version of the menu may be represented by an icon 110 such as a small shape, such as a circle, that may be visible on an edge of the screen (e.g., at the bottom of the screen). In other embodiments, an shape or icon 110 representing the menu system may be located at the top, right, left, in the corners of a user interface, or anywhere else a user places or moves it.

A user may see and interact with an AR environment (e.g., virtual or holographic objects) using an AR enabled headset or goggles. As illustrated, at the bottom of the screen within the headset may a small visible or translucent icon 110 that represents the menu system may be displayed. When the user turns their head, the icon 110 may remain in its relative position on the screen. Keeping the menu system icon 110 visible enables a user to use hand gestures (as detected by the AR headset or goggles) to grab or otherwise interact with the menu system, just as the user can interact with other virtual objects in the AR environment.

In an embodiment, the AR system, through the headset, may detect what the user is doing with the user's hands (e.g., various gestures). For example, a camera in the headset may record or track the user's movements of their hands, and the AR system may covert the movements into corresponding gestures or commands. The AR system may then perform the requesting command on one or more virtual objects, including the menu icon 110.

Example hand gestures (as they may directed to one or more AR objects) may allow a user to grab, move, expand, contract, edit, or otherwise access various AR objects. For example, a grab motion (open and closing of a hand) may be detected by the AR system as a user's intent to grab (and move) a particular object in the AR environment.

In an embodiment, the AR system may be configured to detect a gesture within the vicinity of the menu icon 110 that indicates a user's desire to open, expand, or access the menu system. For example, the headset or other camera may detect where the user's hands are within the AR system, and when the user's hands make a gesture within a virtual vicinity of the menu icon 110, the AR system may interpret the gesture as being associated with the menu icon 110.

In an embodiment, the AR system may interpret a grab and let go gesture made by a user's hand as an intent to expand the menu from the icon 110. As such, the AR system may visually cause the menu icon 110 to expand into a full menu 120 as illustrated in FIGS. 1A and 1B. In another embodiment, a poke 125 or selection of the menu icon 110 button as illustrated in FIG. 1C may also cause an expansion of the menu icon 110 into a fuller version of the menu 120 as illustrated in FIG. 1B.

The menu icon 110 though illustrated in the bottom center of the screen may appear anywhere within the screen that would not be distracting to the user. In an embodiment, the AR system may allow the user to move or determine where they want the menu icon 110 to appear on the screen, the size of the menu icon, and the color or opaqueness of the menu icon. In an embodiment, the AR system may enable a user to choose which gesture(s) the user wants to be interpreted as expanding (from menu icon 110 to full menu 12) or contracting the menu (from full menu 120 to menu icon 11) as described herein.

When the user pokes 125, selects, or grabs and releases the menu icon 110 or button, an expanded or full menu 120 may be made visible to the user within the AR interface (as illustrated in FIG. 1B). The menu itself may have icons (as illustrated in FIG. 1B) that are selectable through a poke, selection, or grab and release. The menu 120 may extend horizontally and/or vertically. If a user is accessing the AR system through a mobile phone or laptop, then the user may access or open the menu by selecting the menu icon 110 with a mouse, keystroke, or touching it on a touchscreen interface.

In an embodiment, a user may grab the menu icon 110 and drag the icon 110 to a different place in the screen to either open it as a full menu 120, or to simply reposition the icon 110 within the AR environment or on the AR interface. For example, in an embodiment, using a left hand may enable a user to move the location of the menu icon 110 using a grab and release gesture, while a right handed grab and release gesture may cause the menu 120 to open/expand. Or for example, a one finger poke 125 may cause the menu icon 110 to expand, while two fingers placed on or around the menu icon 110 may enable the user to move the icon 110, without opening it, to a different location.

In an embodiment, the menu may open/expand to a designated place on the screen (which may have been previously set and/saved by a user, or a system default), or may open/expand wherever the release is detected on the screen (e.g., using their right hand). Then, for example, if the user wants to keep the menu expanded and move the menu 120, the user can use their left hand to move the menu (while keeping it expanded) to a different part of the screen. In an embodiment, the gestures could be reversed for someone who is left-handed, for whom a left hand grab and release would cause expansion, and right hand grab and release may be to move the object.

FIGS. 2A-2C illustrate examples of how the menu dock 210 may be displayed within a user's field of vision, according to some embodiments. Menu dock 210 may refer to either menu icon 110 or an expanded version of the menu 120 as described above.

As illustrated in FIG. 2A, if a user is looking straight ahead (looking directly at the horizon), the menu dock 210 may appear on the edge of the field of vision 205A—on the bottom or top as described above, or either the right or left side. In the example illustrated, the dock 210 may appear on the right edge from the user's perspective. The field of vision 205A, B, C may represent the portion of an AR meeting space that a user sees based on the direction and tilt of their head (e.g., as determined based on the tilt of the headset).

In FIG. 2B, if the user looks down at a particular angle, such as 25 or 45 degrees, the menu dock 210 may remain in the same position until the angle increases beyond a threshold (e.g., beyond 45 degrees). Then, for example, beyond a threshold change in tilt or angle or direction of the user's head (e.g., goggles or headset or camera), as illustrated in FIG. 2C, the AR system may center or increase the display or visibility of the menu dock icon 210 in the field of vision 205C of the user, or may continually shift more towards the center as the user's angle increases.

In another embodiment, the menu may remain expanded (or contracted) below the field vision of the user—the dock 210 may represent the menu or sub-menu in either an expanded or contracted form. Such, when the user looks down beyond a particular threshold, the menu (icon or expanded) may become visible. For example, if a user looks down beyond 45 degrees, the user may see an expanded menu (e.g., 120), but above 45 degrees down, and no menu (or icon 110) may appear in the sightline of the user. The menu may be displayed or maintained on the bottom side of the field of vision of the user because generally speaking down the least utilized view for users in an AR environment—who may generally look up, left, and right—and thus down is least likely to obstruct their field of vision or interaction with other AR objects. In an embodiment, to avoid unintended activation, the menu icon or dock may only be activated when it is in the field of view of the user.

Figure 3:
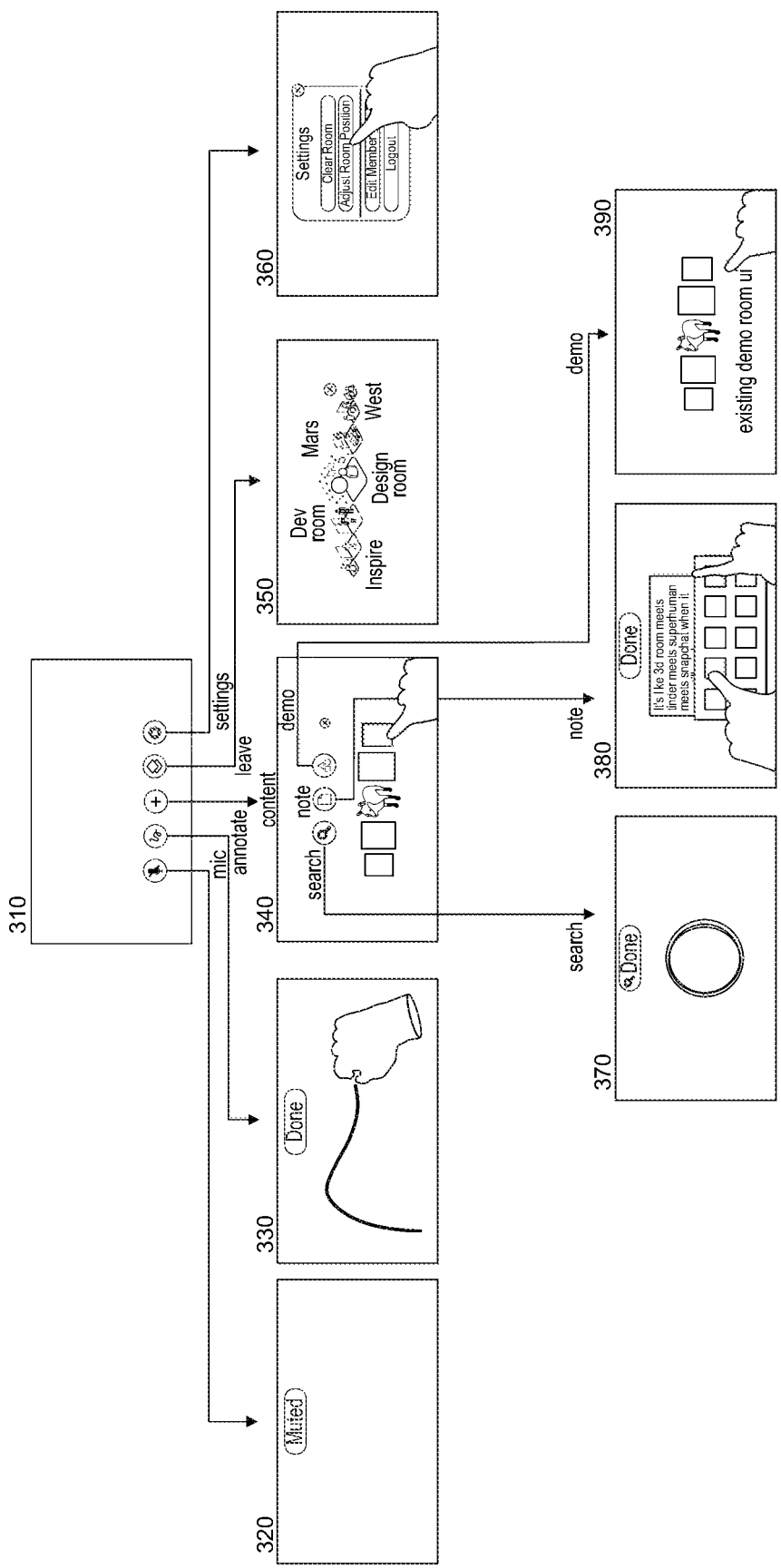
FIG. 3 illustrates various exemplary user interactions with an contextual menu, according to some embodiments.

FIG. 3 illustrates various exemplary user interactions with an contextual menu, according to some embodiments. The various menu options described herein are provided only as examples. When an expanded contextual menu is displayed, as illustrated at 310, a user may select with their hand using a grab-and-release, poke, or other gesture and/or speak a selection of any of the menu options they want to activate.

For example, a user may select or poke the microphone (mic) image to activate the mute functionality of the AR system. 320 illustrates an example interface when the mute functionality has been activated. The mute functionality may mute the user's microphone from interacting with other users in an AR environment. In an embodiment, the voice command options may still be available to the user during mute. For example, a user may speak the phrase "unmute" as a voice command or manually select the mute/unmute microphone or "Muted" label button displayed on the screen to unmute the microphone.

330 illustrates an example interface when a draw or annotate option is selected from the contextual menu of 310. Annotate may enable a user to draw in the AR/VR space. When the user is done drawing, the user may with a hand gesture poke or select the "Done" option on the interface, or speak "Done" or "Done Drawing" and the drawing functionality may be deactivated. In an embodiment, this may cause the main expanded, contextual menu to reappear (as illustrated in 310).

In an embodiment, the menu may include an option to access a sub-menu, as indicated by a plus or other sign. By a user selecting the plus sign, as illustrated in interface 340, the submenu may replace the main menu. In another embodiment, the submenu may be displayed simultaneously with—under or on top of—the main menu from interface 310. In an embodiment, the size of the main menu may be reduced relative to the size of the simultaneously visible submenu, or as illustrated the main menu may disappear while a submenu is displayed. In the example shown, a user may perform a voice activated search, add a note to an AR window, or add or view a demo, which may be another user function in a particular embodiment.

370 illustrates an example search interface. For example, the search functionality may include either voice activated search (as illustrated) or a user may type in search phrases using a mobile device or virtual AR keyboard.

380 illustrates an example interface enabling a user to add a note to the AR or VR environment. As illustrated, the user may use their fingers to type on a virtual keyboard. In another embodiment, the note may record and process voice dictation from the user as a voice memo, or typed up note in which the voice is translated to text.

390 illustrates a user viewing or editing a demo or other multimedia content. 350 illustrates an option allowing a user to leave (or join) a virtual meeting space or room. 360 illustrates an interface enabling a user to adjust or change AR system, user device, or headset settings.

Figure 4:
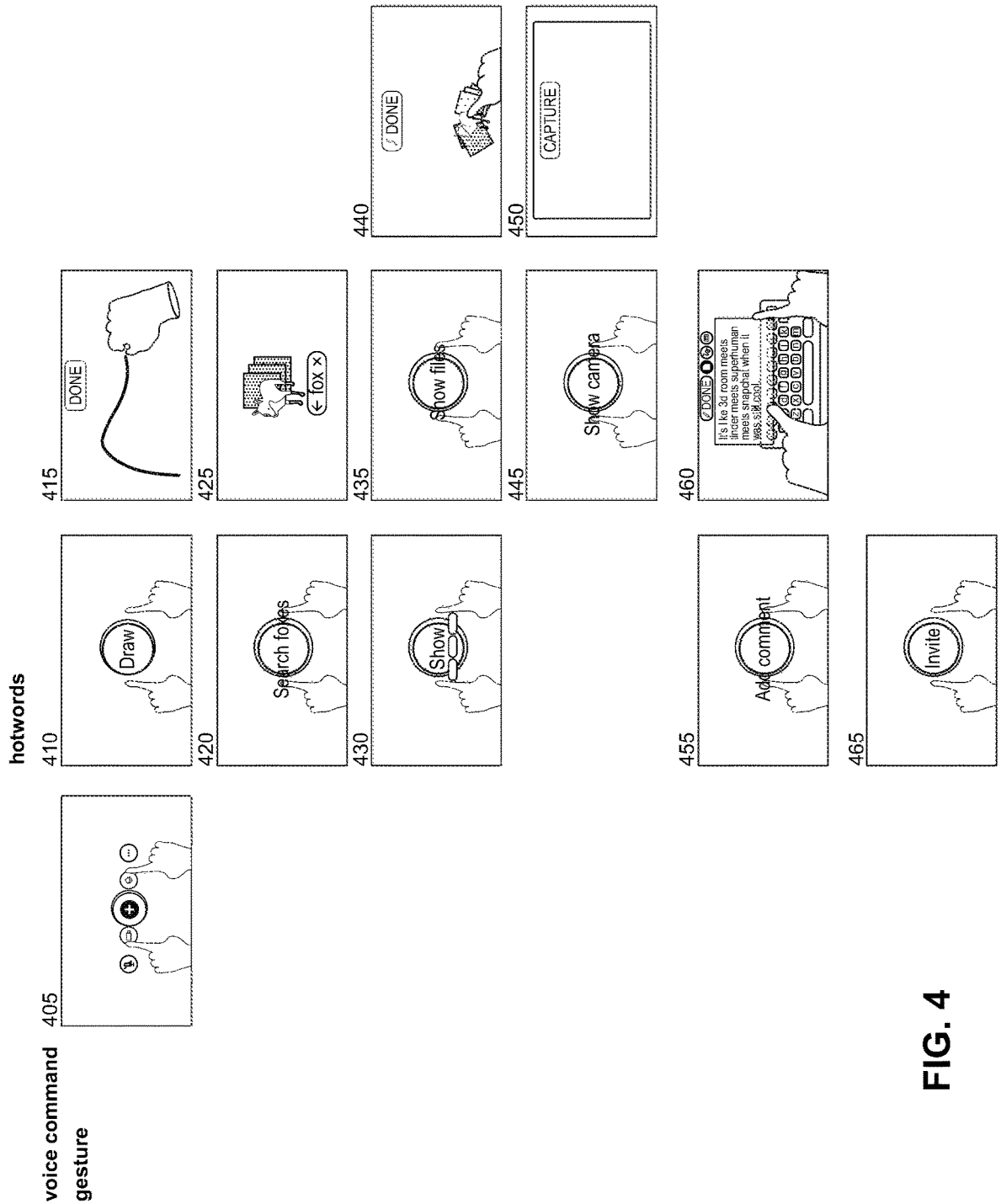
FIG. 4 illustrates various examples of how a user may use a combination of gestures and voice commands to activate menu options, according to some embodiments.

FIG. 4 illustrates various examples of how a user may use a combination of gestures and voice commands to activate menu options, according to some embodiments. In the illustrated examples, the AR system may enable menu activation regardless of whether a menu appears on a screen, or is in an expanded or contracted form.

For example, as illustrated in interface 405, a user may hold up their two index fingers, which may be interpreted by the AR system as a user's intent to speak a command to be interpreted by the AR system. Requiring a particular hand gesture, such as two fingers, may, for example, prevent the AR system from launching functionality based on what a user is speaking to another user within the AR meeting space. For example, if a user says he wants to draw something to another user, this should not activate the draw command, unless a hand gesture indicating the intent to speak a command is detected (e.g., two fingers up). The user may then speak a command or hotword, which may be a menu shortcut to activate particular AR system functionality.

Example hotwords an functionality include: draw, search [followed by a phrase on which a user wants to perform a search], show [followed by an indication of what a user wants displayed], add comment, or invite AV to invite another user to a room. In other embodiments, other hotwords may be used to launch various applications or functionality within the AR space, such as record, camera, word processing, etc.

Interface 410 illustrates an example of a user speaking a draw command with the specified hand gesture activating the listening functionality of the AR system. In an embodiment, the interface may display the received command (e.g., show the word "Draw"). Interface 415 illustrates an example of a user drawing in the virtual environment.

Interface 420 illustrates an example of a user speaking a search command, with the search phrase "Foxes". Interface 425 illustrates an example of a result of the search command for foxes or other animals, including but not limited to foxes.

Interface 430 illustrates an example of a user speaking a show command with the hand gesture activated. The show command may be a request to display or activate particular functionality such as image or video files, or a camera. The commands of files and camera illustrated are merely exemplary, and are not an exhaustive list.

Interfaces 435 and 440 illustrate the process and exemplary result of a user activating a "Show files" command. Interfaces 445 and 450 illustrate the process and exemplary result of a user activating a "Show camera" command (which may cause a camera/view lens to appear on the interface). With camera 450, a user may select the capture command to take a picture of the interface (as seen from the user's point of view) or to begin recording the AR environment.

Interfaces 455 and 460 illustrate the process and exemplary result of a user activating an "Add comment" (or annotation) command, that enables the user to speak or type a comment card or annotation in the virtual environment. Interface 465 illustrates an example of a user activating a "Invite" command that may allow the user to invite other users to a particular room within the AR system or virtual environment.

In another embodiment, a user may use another hand gesture (other than two fingers) or poke or select a menu command or voice icon on the screen to activate the voice command or hotword mode of the AR system. In an embodiment, while the voice command mode is activated, the microphone of the user may be muted such that other users cannot hear what the user is saying while in voice command mode.

Figure 5:
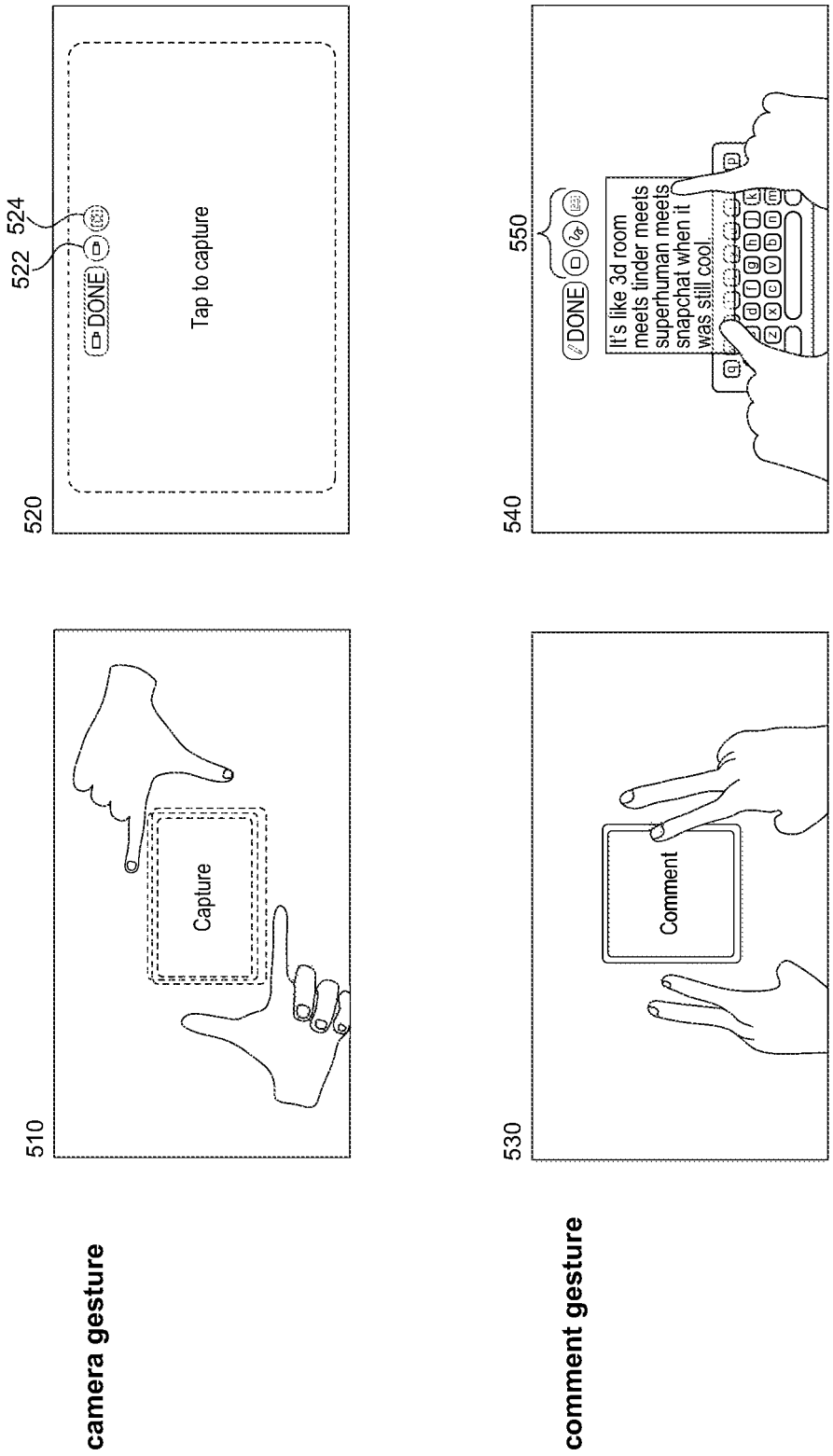
FIG. 5 illustrates various example gestures that may be used to activate particular functionality within the AR system, according to some embodiments.

FIG. 5 illustrates various example gestures that may be used to activate particular functionality within the AR system, according to some embodiments. The gestures described with reference to FIG. 5 may be used with or without corresponding voice commands.

Interface 510 illustrates a user making a camera or capture command with their fingers, which may interpreted by the AR system to take a screen shot of the VR environment (from the user's or another point of view). Or, the capture command may display the command being executed on the screen "Capture" and launch a camera interface 520 that enables a user to focus and take an image by selecting the picture option 522, or record video of a portion of an AR environment by selecting the record option 524 from a contextual menu.

Interface 530 illustrates an example comment gesture which a user may raise two fingers or draw a comment card. The comment gesture may launch interface 520 where a user is provided an AR virtual keyboard or a voice-to-text functionality that enables the user to compose an annotation or note by typing and/or speaking. The note may then be saved for only the user to see, or may be shared with other users within the AR computing environment. The comment functionality may also allow a user to select any options from a contextual menu 550.

Figure 6:
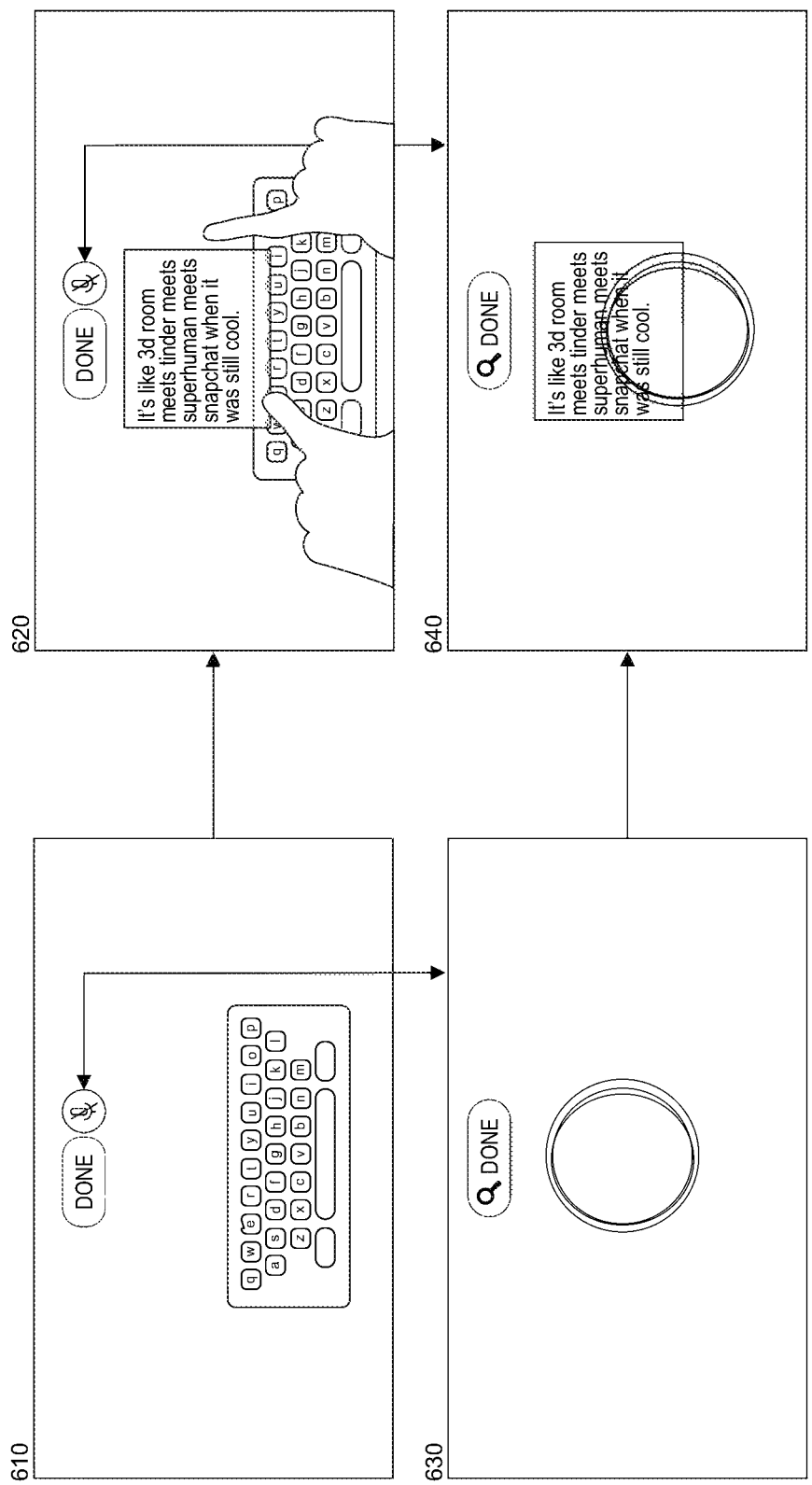
FIG. 6 illustrates two different methods a user may use to enter text for typing on a surface, according to some embodiments.

FIG. 6 illustrates two different methods a user may use to enter text for typing on a surface, according to some embodiments. Interface 610 illustrates a virtual keyboard which may appear when a user wants to type text using hand gestures. In an embodiment, the AR or virtual keyboard may appear when the user has selected the mute option, or by the user selecting a keyboard icon in a contextual menu. Interface 620 illustrates a user typing a note or annotation using a virtual keyboard.

In an embodiment, if the user turns off the mute command, the user interface of the AR system may switch from displaying the virtual keyboard of 610 or 620 to the voice command input circle illustrated in interfaces 630 and 640. Interfaces 630 and 640 illustrate a user using a voice-to-text functionality to compose a note or message, such as a sticky pad or note or within a document, within the AR space.

In an embodiment, the user may speak the words that the user wants the AR system to translate into text, as represented by the graphical circles (which may be animated) as illustrated in 630 and 640. In an embodiment, if the user is in an AR meeting space with other users, the voice command operation to type may automatically cause the AR system to mute the user so that other users in the AR meeting space will not or cannot hear what the user is speaking.

As illustrated in 620 and 640, the user may toggle or alternate back and forth between using the virtual keyboard and voice commands to type a note or document. In an embodiment, both the virtual keyboard and voice-to-text may be simultaneously activated for a user.

As illustrated in 640, as the user speaks, the words may appear on the screen—in a document or on an annotation note—for only the user to see while in draft form. When the user is done with the annotation, the user may 'make live' 'save' or 'activate' and share the document with other users in the AR meeting space. In another embodiment, the AR user may allow other users to hear and participate in the voice activated typing process. For example, the voice activation may be activated for all the users of an AR meeting space.

Interface 620 illustrates an example of a user entering text using a virtual or AR keyboard, in which a user may type with their fingers the various buttons. In an embodiment, the keyboard and note may be sharable amongst various users in the meeting space—if visible during a draft mode.

Figure 7:
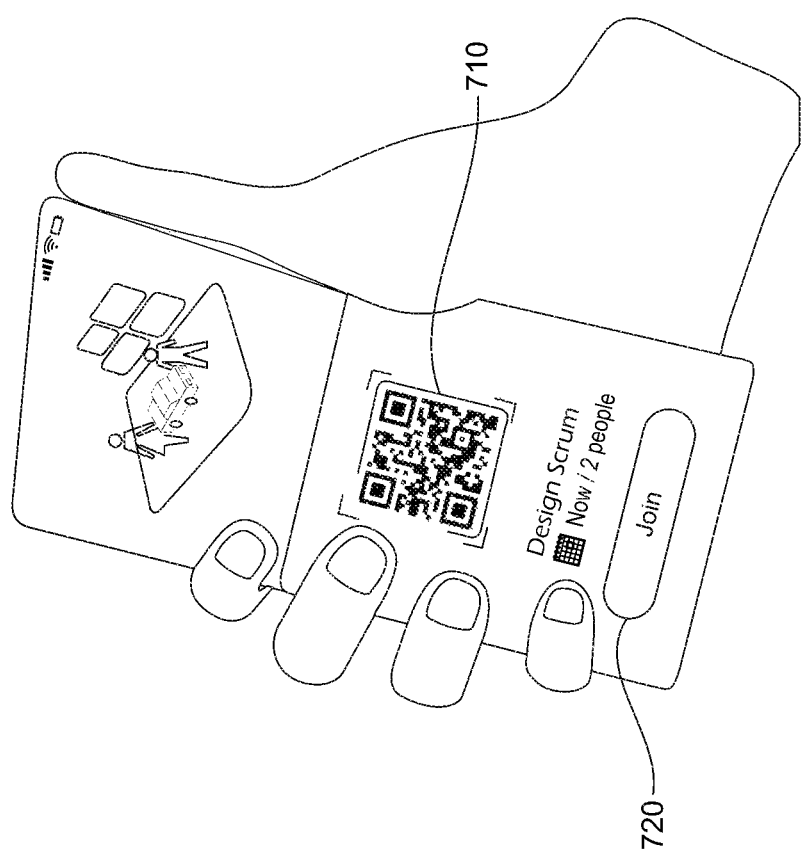
FIG. 7 illustrates an example of a system-generated code or invitation that may be used to invite users to join an AR system, according to an embodiment.

FIG. 7 illustrates an example of a system-generated code or invitation that may be used to invite users to join an AR system, according to an embodiment. As illustrated, an AR system may generate a QR (quick response) code 710 or meeting code (e.g., as a set of characters) which may be scanned by a user's AR headset. The AR headset may then launch the user directly into the meeting room.

In another embodiment, a user logging into the meeting space through a mobile phone or laptop may be prompted to enter the meeting code to directly enter the room. Or the user may select the join option 720 to be directed to the meeting room from a mobile device or laptop. In an embodiment, an AR meeting space may be password protected thus requiring the user to enter a password that is particular to the user and/or the meeting space in order to enter the room.

Figure 8:
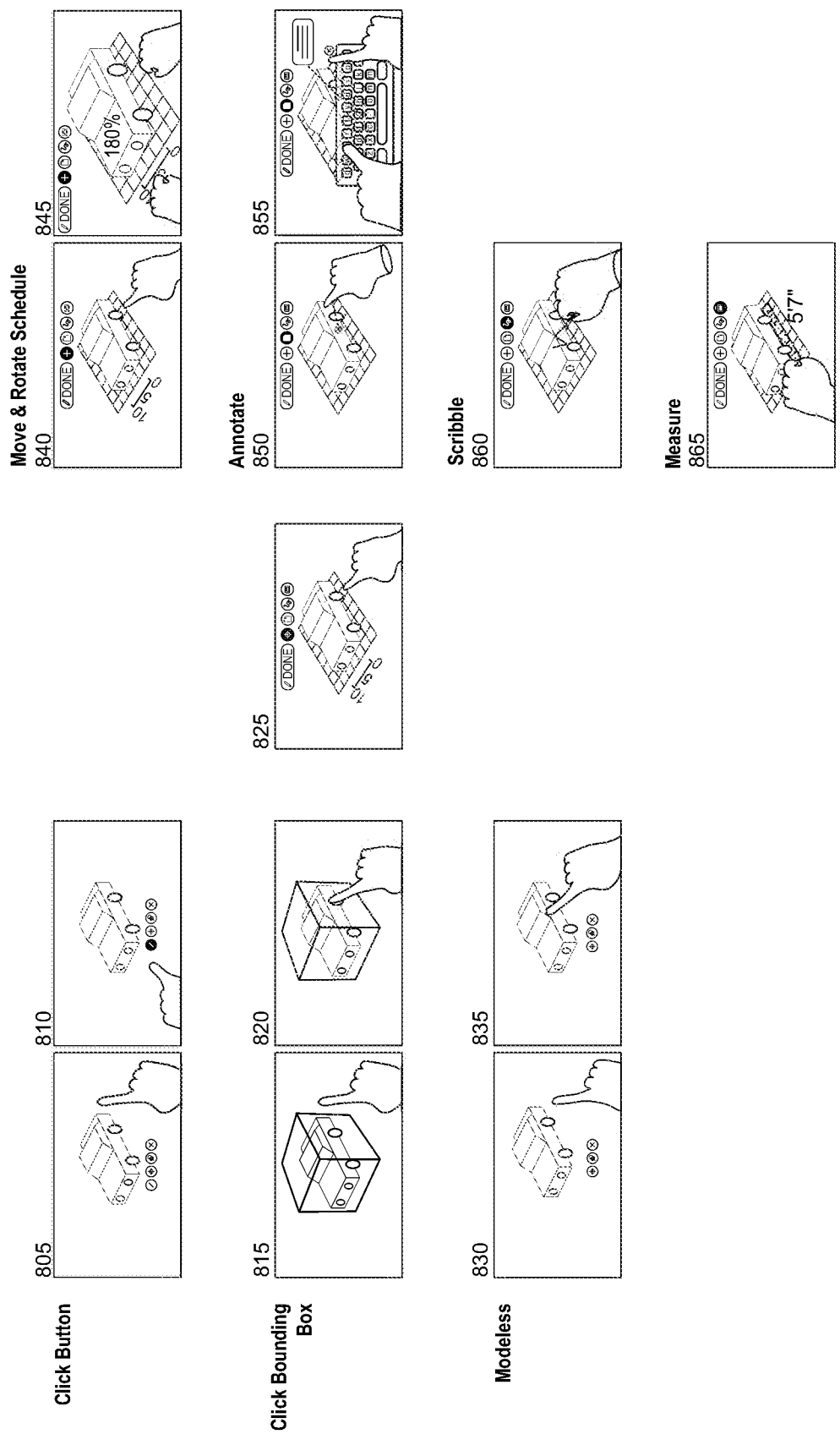
FIG. 8 illustrates various examples of how a user may interact with objects in an AR environment, according to some embodiments.

FIG. 8 illustrates various examples of how a user may interact with objects in an AR environment, according to some embodiments. Example functionality includes the ability for a user to draw, edit, interact with, view, or otherwise access models of real world objects. For example, a user may create a model of a house or a car using modeling software. The object may be a real-world object they own, or one that is being designed for fun or for later manufacture or build. In an embodiment, the AR system may receive the model of the car from the user or another modeling program, including the colors and dimensions of various parts of the car. In another embodiment, the model may be digital object without a real-world equivalent, that is usable in the AR meeting space.

The AR system may then make the model available for AR/VR access or interaction within one or more AR meeting spaces. For example, the AR system may generate a virtual model of the car in a virtual showroom to share or that may be accessible to other users in the AR system, using their headsets or laptops.

As illustrated in interfaces 805 and 810, a user may click any of the menu buttons to activate particular commands or functionality associated with that button. For example, a user may activate a draw, annotate, or scribble functionality that enables the user to draw on or within the model of the car in the AR system. For example, the user may draw both inside and outside of the car. This may also be activated as a scribble or annotation functionality.

With annotations as illustrated in interfaces 850 and 855, the user may write notes and stick them to different parts of the car for other users to read or modify. For example, the user may stick an annotation to the driver side door that says the user wants to change the color of the door. Or attach a note to the trunk indicating that the trunk space may be too small. Then other users who log in to view the car in the AR meeting space may see the notes as they are attached to different parts of the car, or may view the notes in real-time as they are attached. In an embodiment, a second user may edit the note originally posted by the first user, and the AR system may track the changes by each user on each note. The AR system may also track who is accessing or reading the notes.

In an embodiment, the modeling functionality may include the ability for a user to see a bounding box as illustrated in interfaces 815 and 820 or grid as illustrated in interface 825 around the car, or may simply view the car model with modeless or display activation as illustrated in interfaces 830 and 835.

In an embodiment, the AR system may enable the user, using their hands or hand gestures to move, rotate, scale, and interact with the model as illustrated in interfaces 840 and 845. For example, a user may increase or decrease the size of the car. Interface 845 shows a 180% increase in the size/scale of the car, as performed by user gestures, relative to the same car in interface 840. The user may open the doors and look inside the car, and post sticky notes or annotations or draw both inside and outside the car.

In an embodiment, the AR system may allow a user to measure the dimensions of the car as illustrated in interface 865. In an embodiment, the dimensions of the car may be initially provided as part of the model. Then even as a user changes the size of the car in the AR system (e.g., making the car small enough to fit in their digital hand, or so large it's twice the size of an AR avatar, the measurements of the car may remain the same. For example, if the car model indicates that the car is five feet, seven inches in length, even if the car is reduced to the size of a user's hand in the AR system, the car may still be measured as five feet, seven inches in length. In an embodiment, the AR system may produce a digital measuring tape, ruler, or dimension boxes showing various dimensions of the car, as imported from the model.

In an embodiment, the user in the AR system may scale the car, and adjust the dimensions of the car itself as represented in the model. For example, if during a scaling operation, the user reduces the car from its original size to fit into its hand, the length measurement may change from five feet, seven inches to four feet.

Figure 9:
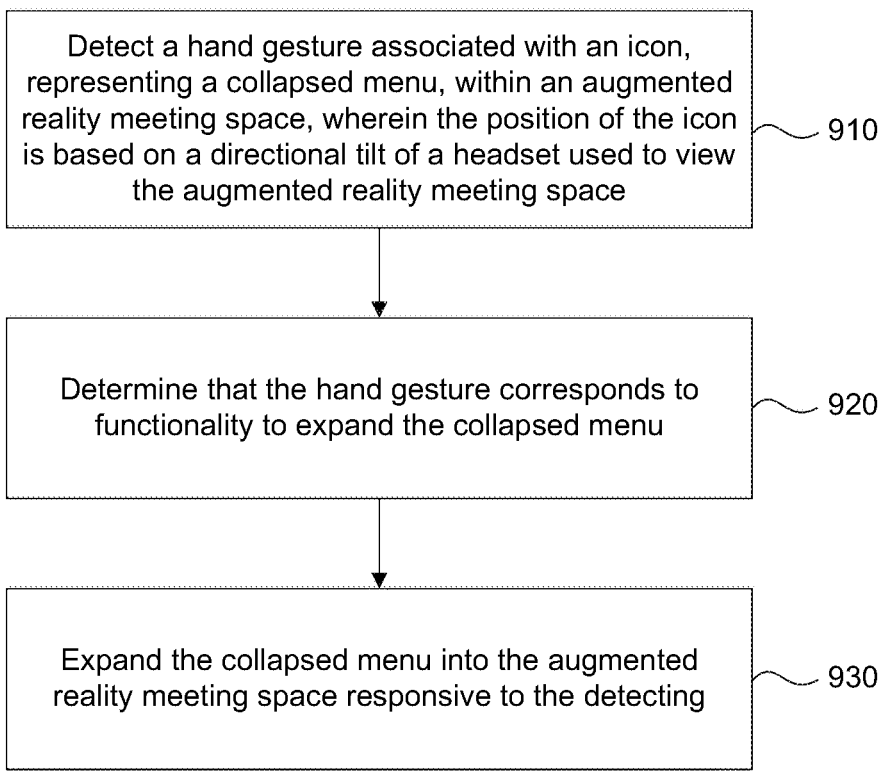
FIG. 9 is a flowchart illustrating example operations for providing an augmented reality interaction system, according to some embodiments.

FIG. 9 is a flowchart 900 illustrating example operations for providing an augmented reality interaction system, according to some embodiments. Method 900 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 9, as will be understood by a person of ordinary skill in the art. Method 900 shall be described with reference to the figures.

In 910, a hand gesture associated with an icon, representing a collapsed menu, is detected within an augmented reality meeting space, wherein the position of the icon is based on a directional tilt of a headset used to view the augmented reality meeting space. For example, a headset may detect a hand gesture as illustrated in FIGS. 1A-1C with regard to a menu icon in an augmented reality meeting space. As illustrated in FIGS. 2A-2C, the position and/or size of the menu and/or menu icon may vary based on the tilt, angle, or direction in which a user's headset is positioned.

In 920, it is determined that the hand gesture corresponds to functionality to expand the collapsed menu. For example, as illustrated in FIGS. 1A and 1C, particular hand gestures may correspond to an intent to expand the menu icon to a full menu. In another embodiment, a similar or different gesture may cause the AR system to collapse an expanded menu back into a menu icon.

In 930, the collapsed menu is expanded into the augmented reality meeting space responsive to the detecting. For example, as illustrated in FIG. 1B, the men icon may be expanded, extended, or contextualized into a fuller menu. In an embodiment, a menu icon may be expanded multiple times, each time including more menu options. For example, a menu icon may be expanded into four core or commonly used commands. Then the four commonly used commands may be further expanded (with another hand gesture) into a new set of less commonly used commands. These may be set, determined, or saved by the user and may be user specific.

Figure 10:
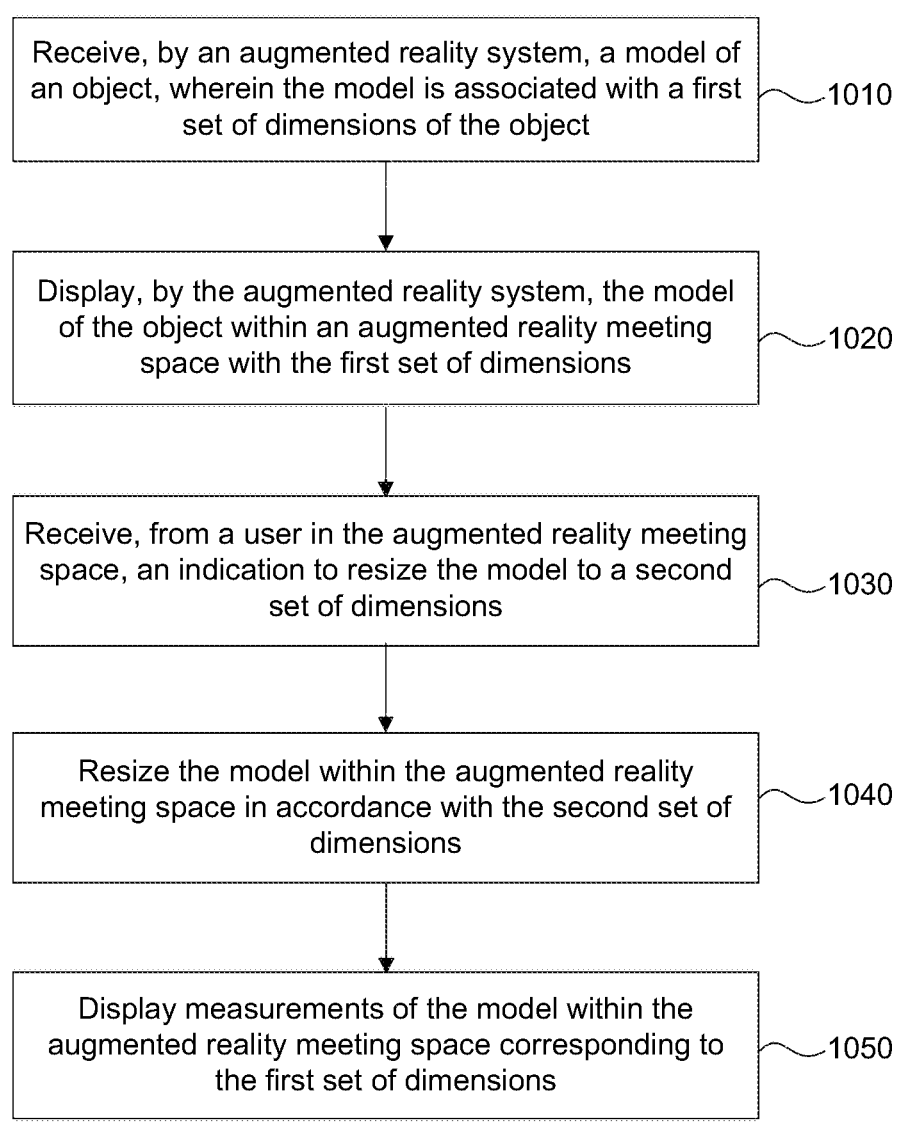
FIG. 10 is a flowchart 1000 illustrating example operations for providing an augmented reality interaction system, according to some embodiments.

FIG. 10 is a flowchart 1000 illustrating example operations for providing an augmented reality interaction system, according to some embodiments. Method 1000 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 10, as will be understood by a person of ordinary skill in the art. Method 1000 shall be described with reference to the figures.

In 1010, receiving, by an augmented reality system, a model of an object, wherein the model is associated with a first set of dimensions of the object. For example, as illustrated in FIG. 8, a model of a car may be received by an augmented reality system.

In 1020, displaying, by the augmented reality system, the model of the object within an augmented reality meeting space with the first set of dimensions. For example, the car may have been previously modeled using modeling software with a specific set of dimensions for the car, height, length, diagonal, etc. The augmented reality system may also include other car features such as: make, model, weight, color, interior, gas mileage, condition, year, etc.

In 1030, receiving, from a user in the augmented reality meeting space, an indication to resize the model to a second set of dimensions. For example, a user may use hand gestures, detected by a headset to increase or decrease the size of the model within the AR meeting space.

In 1040, resizing the model within the augmented reality meeting space in accordance with the second set of dimensions. For example, responsive to the user hand gestures, the AR system may change the size of the car relative to one or more other virtual objects, such as avatars within the AR meeting space.

In 1050, displaying measurements of the model within the augmented reality meeting space corresponding to the first set of dimensions. For example, a user may request the dimensions of the car, in which case, the originally modeled dimensions may be provided, regardless or independent of the size of the car within the AR meeting space.

In another embodiment, the user may opt to scale the car within the AR meeting space, which may impact the dimensions. Then, for example, a user requesting a measurement of the car may be provided with the new, adjusted measurements based on the scaling. The measurements may be provided via an AR measuring table which the user can handle, that corresponds to real world or the original measurements, or may be provided for display in a list form, or in a bounding box which indicates the height, length, etc.

Figure 12:
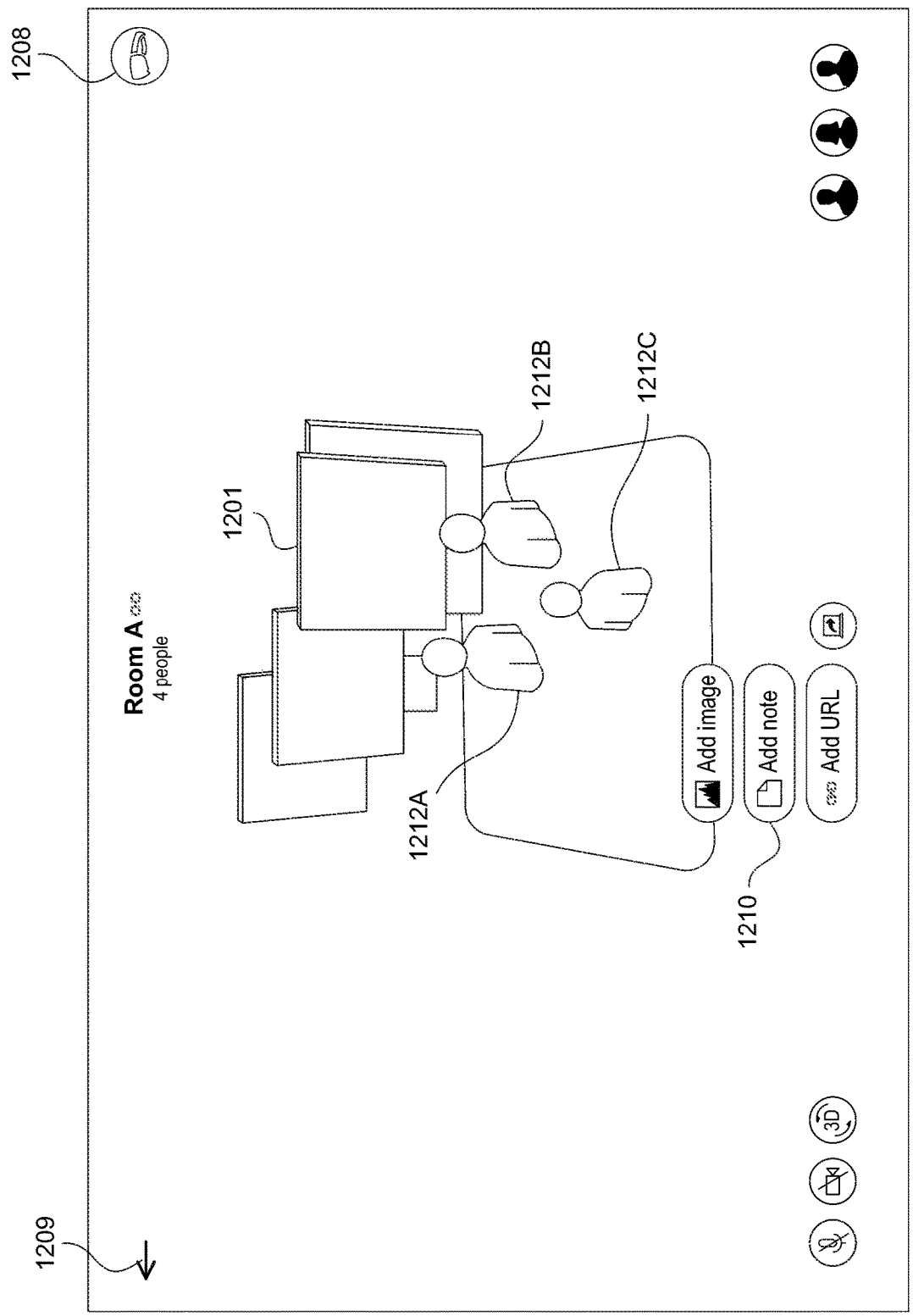
FIG. 12 is example screen display of a spectator view including a content-drop menu, according to some embodiments.

FIG. 12 is example screen display of a spectator view including a content-drop menu, according to some embodiments. The screen display provided in FIG. 12 is merely exemplary, and one skilled in the relevant art(s) will appreciate that many approaches may be taken to provide a suitable screen display in accordance with this disclosure.

Content menu 1210, an example contextual menu, may allow a user to upload content from their mobile device, laptop computer, or other computing device into the AR meeting space. Content menu 1210 may be accessed by a user engaging drop-content button 1205. For example, a user may add an image or photograph from their device, copy a link into the AR meeting space, or add a sticky note as a digital object into the AR meeting space. In another embodiment, the content menu 1210 may be expanded from and/or collapsed into a menu icon as described herein.

Avatars 1212A-C may be representations of users active in an AR meeting space. Avatars 1212 may uniquely identify and distinguish a user in the system from other users, allowing the viewing user to easily determine the identity of the user in the AR meeting space, on the AR meeting space launcher, or elsewhere in the AR system. Numerous approaches may be taken to create an avatar in the AR meeting space. In one embodiment, a user may create an avatar manually that represents their digital selves. In another embodiment, a user may upload an image and the image may be displayed as the user in the AR meeting spaces. In another embodiment, a video feed may be captured, e.g., by a webcam or camera on a mobile device, and the video feed placed in the AR meeting space to represent the user. In another embodiment, a mobile device may use a real-time face capture, e.g., using infrared, and AR/VR cloud system may assemble this into a digital representation in the AR meeting space that moves with the users facial expressions.

Figure 13:
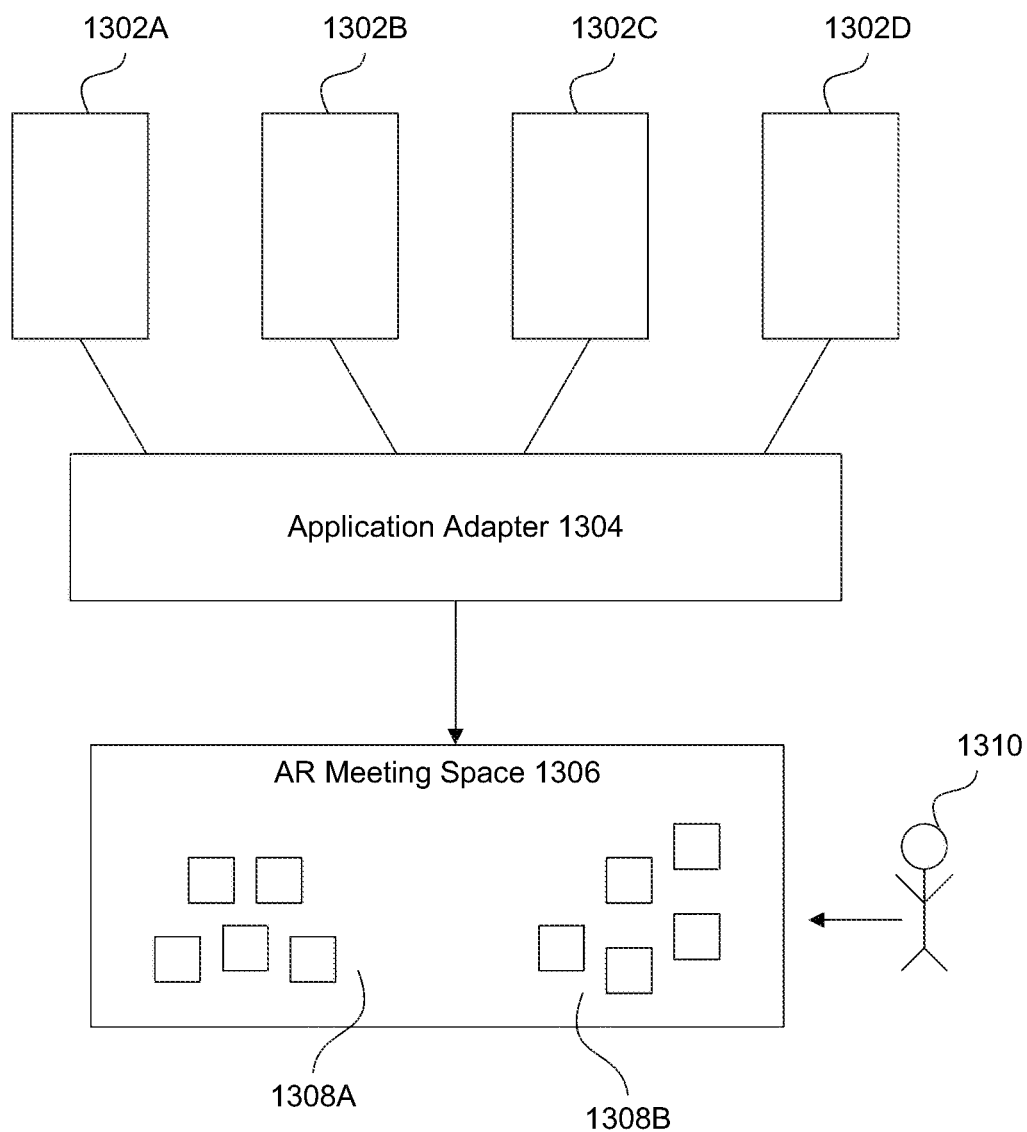
FIG. 13 is a block diagram of AR environment, according to some embodiments.

FIG. 13 is a block diagram of AR environment 1300, according to some embodiments. Any operation herein may be performed by any type of structure in the diagram, such as a module or dedicated device, in hardware, software, or any combination thereof. Any block in the block diagram of FIG. 13 may be regarded as a module, apparatus, dedicated device, general-purpose processor, engine, state machine, application, functional element, or related technology capable of and configured to perform its corresponding operation(s) described herein. AR environment 1300 may include media sources 1302, application adapter 1304, AR meeting space 1306, three-dimensional representation 1308, and user 1310.

Media sources 1302 may include social media, news feeds, web sites, email feeds, search results, and many other media types that are capable of providing structured data to AR/VR cloud system 206 for representation in an AR meeting space in three dimensions. Examples of social media may include feeds from FACEBOOK, INSTAGRAM, TWITTER, etc. Examples of web sites include news sites, such as THE WASHINGTON POST or THE NEW YORK TIMES, or any other web site available via the world wide web or other hypertext transfer protocol. Media sources may provide an RSS feed that may be accessed by AR/VR cloud system to pull/retrieve information from the media source. Such an RSS feed may be filtered to include information relevant to a particular user or subset of users within the AR system. An email feed may be accessed through a suitable email protocol, e.g., SMTP, POP3, etc.

Application adapter 1304 may transform structured data, include models, received from the media source into a three-dimensional representation. Application adapter 1304 may identify a source of the media and deploy a customized, enhanced adapter if the source is known and such an enhanced adapter exists. Application adapter 1304 may employ a default adapter where the source and/or type is not known. A default adapter may provide baseline interaction techniques by representing the structured data in a simplistic fashion.

To transform the data, application adapter 1304 may identify content provided by the media source while dividing the content into appropriate sections or groups. For example, in an RSS feed, application adapter 1304 may divide information "<item>" tags into separate sections. For another example, for a web page, application adapter 1304 may break down a particular web page into sections based on<iframe> tags, <section> tags, etc. Application adapter 1304 may extract from the structured data images, videos, sound files, etc. to be associated/displayed with the determined content and/or sections.

By grouping the received data into sections that may be manipulated, application adapter 1304 may select an appropriate three-dimensional interaction model to apply to the three-dimensional representation. For example, if the media source is a news feed, a three-dimensional representation may be displayed that is tailored to allow users to interact with news feed. In another example, if the media source is a WIKIPEDIA page, then an appropriate three-dimensional representation may be provided that is specific to WIKIPEDIA entries. Such an example is discussed above with referenced to FIG. 6A. The breadth and scope of functionality that is available to users when viewing the three-dimensional representation may vary according to the type of media source being viewed. Advanced techniques to sort, group, search, organize, view, etc. data may be available in three dimensions that are not available in two dimensions.

Application adapter 1304 may be further enhanced to apply particularized expectations about a specific media source to derive additional information to include in the three-dimensional representation. For example, a particularized adapter may be deployed to parse a NEW YORK TIMES news feed that differs from a particularized adapter deployed to a comparable WASHINGTON POST news feed. Such an enhanced application adapter may gather additional information from the structured data provided by the media source and render incorporate that information into the three-dimensional representation.

AR meeting space 1306 is an augmented reality meeting space, as described in detail above. Application adapter 1304 may provide a three-dimensional representation to AR/VR cloud system 206 to recreate in AR Meeting Space 1306.

3D representations 1308, such as 3D representation 1308A and 1308B may be displayed in AR meeting space 1306 to represent the structured data received from media sources 1302 and transformed by application adapter 1304. Various media sources are described throughout this disclosure specifically with respect to their representation in AR meeting spaces in three dimensions, e.g., as 3D representations 1308.

These three-dimensional representations are merely exemplary, but provide suitable examples of three-dimensional representations of social media feeds, web pages, and search results. Additional three-dimensional representations may be developed to display other media sources, such as email feeds, tasklists, and any other suitable structured data that may be received from an external source and represented in three dimensions in an AR meeting space.

User 1310 may view three-dimensional representations 1308 in AR meeting space 1306 using an AR headset, or in other embodiments, a mobile device or laptop computer.

Figure 14:
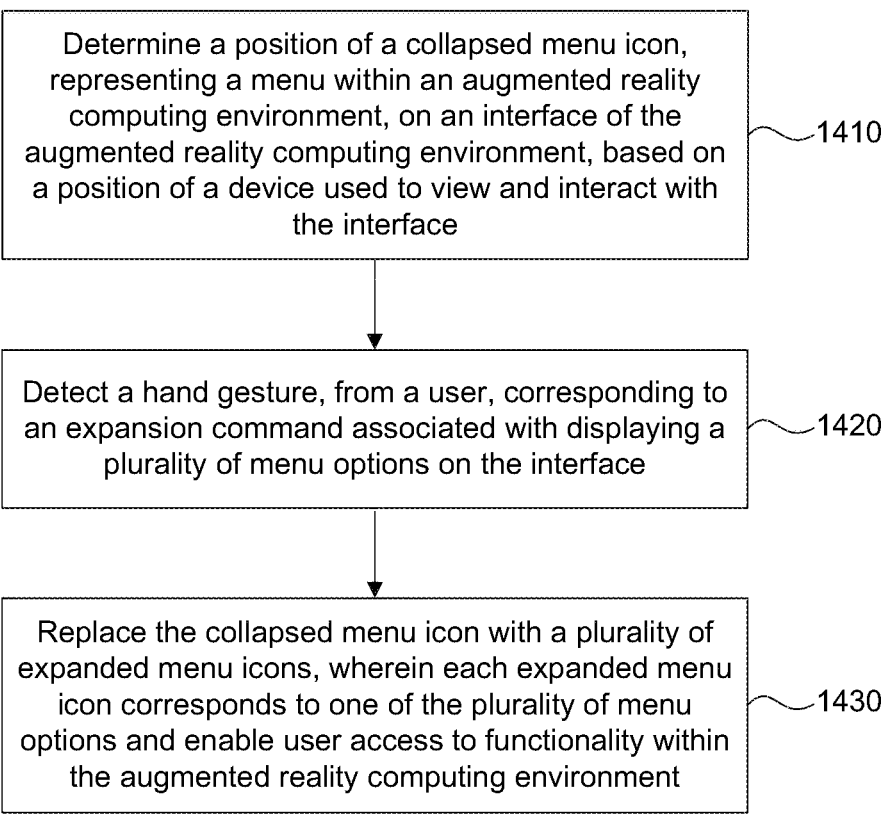
FIG. 14 is a flowchart illustrating example operations for providing a contextual menu system, according to some embodiments.

FIG. 14 is a flowchart 1400 illustrating example operations for providing contextual menu system, according to some embodiments. Method 900 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 14, as will be understood by a person of ordinary skill in the art. Method 1400 shall be described with reference to the figures.

At 1410, a position of a collapsed menu icon representing a menu within an augmented reality computing environment is determined on an interface of the augmented reality computing environment based on a position of a device used to view and interact with the interface. For example, in FIG. 1A, the collapsed menu icon 110 is illustrated on an interface of an augmented reality computing device that is interacting with an augmented reality computing system. As illustrated in FIGS. 2A-2C, the position of the dock 210 (which may include an expanded or collapsed menu) may shift in accordance with a position of a headset or other device used to view and interact with the interface.

At 1420, a hand gesture from a user corresponding to an expansion command associated with displaying a plurality of menu options on the interface is detected. For example, as illustrated in FIGS. 1A and 1B a hand gesture to grab and release or open the menu icon 110 may be detected by a camera integrated into a user headset and communicated to the augmented reality computing system. The augmented reality system, or headset, may detect the hand gesture as corresponding to an expansion command and cause the menu to expand from the menu icon 110 to an expanded version of the menu 120.

At 1430, the collapsed menu icon is replaced with a plurality of expanded menu icons, wherein each expanded menu icon corresponds to one of the plurality of menu options and enable user access to functionality within the augmented reality computing environment. For example, as illustrated in FIG. 2B, the menu icon 110 is replaced with the variety of icons illustrated in the expanded menu 120. The expanded menu 120 may appear in the same relative location on the interface as the menu icon 110, or may open to a previously configured or designated location on the interface for the expanded menu 120 to open.

Figure 15:
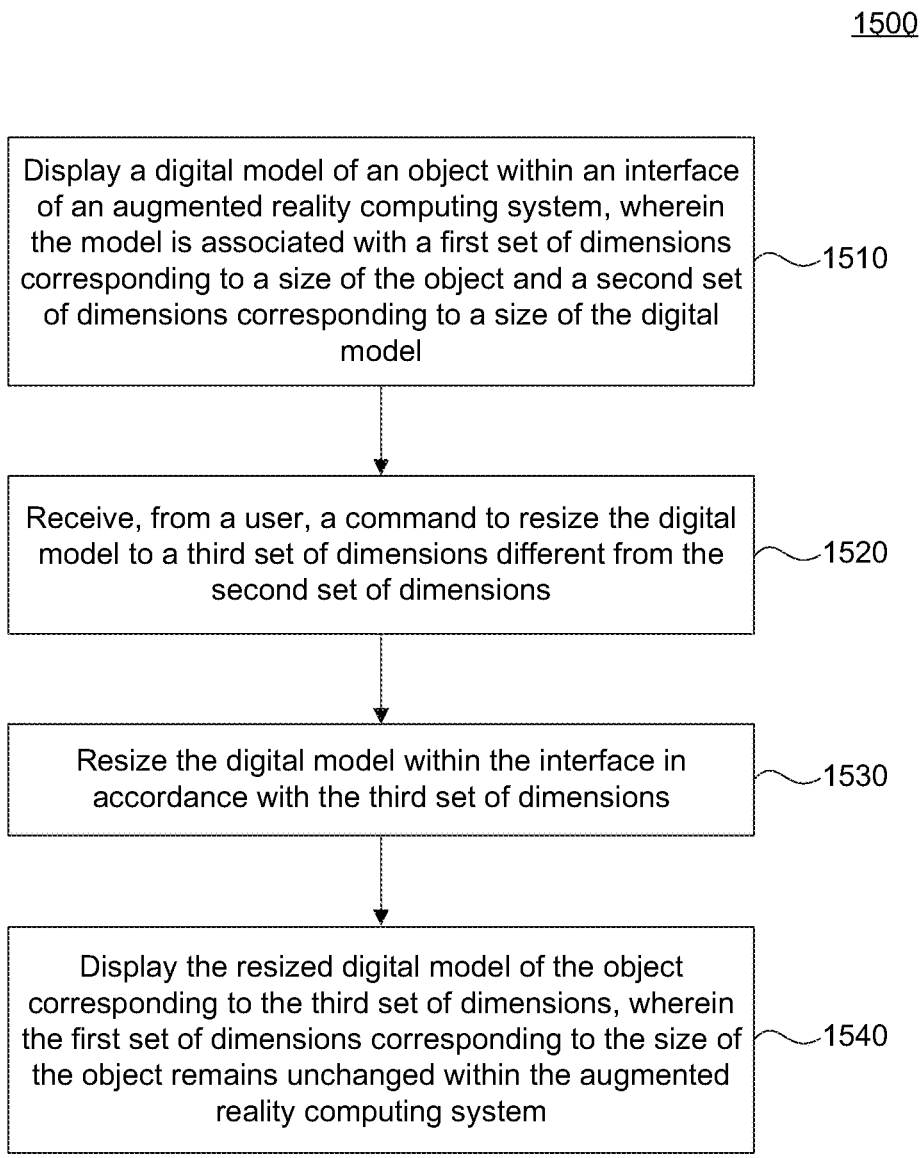
FIG. 15 is a flowchart illustrating example operations for providing an interaction, modeling, and annotation system, according to some embodiments.

FIG. 15 is a flowchart 1500 illustrating example operations for providing an interaction, modeling, and annotation system, according to some embodiments. Method 900 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 15, as will be understood by a person of ordinary skill in the art. Method 1500 shall be described with reference to the figures.

At 1510, a digital model of an object is displayed within an interface of an augmented reality computing system, wherein the model is associated with a first set of dimensions corresponding to a size of the object and a second set of dimensions corresponding to a size of the digital model. For example, as illustrated in interface 840 of FIG. 8, a model of a car may be loaded into an augmented reality computing system. The digital model of the car as rendered in interface may represent a real car that has been built, or may be designed for real-world manufacture. The digital model may have been generated within the augmented reality computing environment, or loaded into the AR system after being created, generated, or modified in another application.

At 1520, a command to resize the digital model to a third set of dimensions different from the second set of dimensions is received from a user. For example, as illustrated in interface 845, the augmented reality computing system may detect zoom or increase the size gestures that causes the size of the digital model to increase in size.

At 1530, the digital model is resized within the interface in accordance with the third set of dimensions. For example, as illustrated in interface 845, the digital model of the car may be increased to 180% of its original size.

At 1540, the resized digital model of the object corresponding to the third set of dimensions is displayed, wherein the first set of dimensions corresponding to the size of the object remains unchanged within the augmented reality computing system. For example, as illustrated in interface 865, the length measurement of the car may be indicated as being five feet, seven inches (5'7"). As can be seen, the interface simultaneously displays the measurement with the resized car. This may be measurement of the car both prior and after the increase or decrease of the size of the car as illustrated between interfaces 840 and 845.

In interface 840 a measurement scale is illustrated that shows 10, 5, and 0. This scale may enable a user to see the dimensions of the real-world car that is represented by the digital model. As illustrated in interface 845, the scale has increased in size by the same proportion the car has increased in size, so that the car relative to the scale has not changed. While the scale is shown as measuring a width of the car, there may be any number of scales illustrated, indicating length, width, height, and may be displayed numbers as illustrated in interface 865, measuring tape, or any other visual or auditory format.

The augmented system enables a user to change and play with the size of the car within the augmented reality meeting space, without affecting the measurements of the model as it represents a real-world car. As with modeling software, the user can also change the measurements of the object represented by the car within the AR space. So if the user wanted to reduce the size from 5'7" to 5'4", the user could do that.

As indicated above, interfaces 850 and 855 illustrate a user's ability to annotate or add notes to the model of the car. These annotations or scribbles (at interface 860) may remain with the model of the car regardless of its size and remain accessible the one or more users of the augmented reality space.

Figure 11:
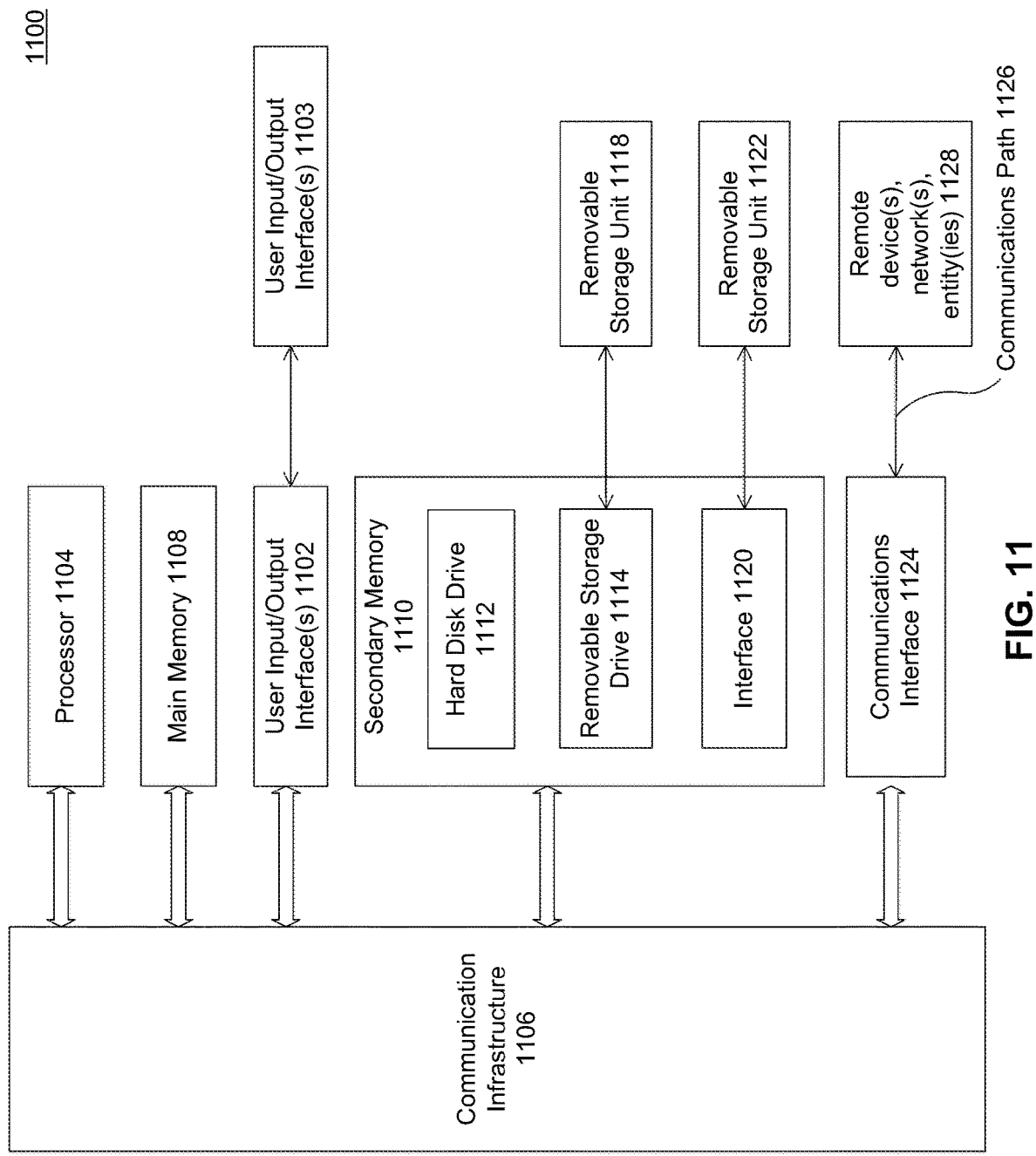
FIG. 11 is an example computer system useful for implementing various embodiments.

FIG. 11 is an example computer system useful for implementing various embodiments.

Computer system 1100 may include one or more processors (also called central processing units, or CPUs), such as a processor 1104. Processor 1104 may be connected to a communication infrastructure or bus 1106.

Computer system 1100 may also include user input/output device(s) 1103, such as monitors, keyboards, pointing devices, etc., which may communicate with communication infrastructure 1106 through user input/output interface(s) 1102.

One or more of processors 1104 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1100 may also include a main or primary memory 1108, such as random access memory (RAM). Main memory 1108 may include one or more levels of cache. Main memory 1108 may have stored therein control logic (i.e., computer software) and/or data.

Computer system 1100 may also include one or more secondary storage devices or memory 1110. Secondary memory 1110 may include, for example, a hard disk drive 1112 and/or a removable storage device or drive 1114. Removable storage drive 1114 may be a floppy disk drive, a magnetic tape drive, a compact disk drive, an optical storage device, tape backup device, and/or any other storage device/drive.

Removable storage drive 1114 may interact with a removable storage unit 1118. Removable storage unit 1118 may include a computer usable or readable storage device having stored thereon computer software (control logic) and/or data. Removable storage unit 1118 may be a floppy disk, magnetic tape, compact disk, DVD, optical storage disk, and/any other computer data storage device. Removable storage drive 1114 may read from and/or write to removable storage unit 1118.

Secondary memory 1110 may include other means, devices, components, instrumentalities or other approaches for allowing computer programs and/or other instructions and/or data to be accessed by computer system 1100. Such means, devices, components, instrumentalities or other approaches may include, for example, a removable storage unit 1122 and an interface 1120. Examples of the removable storage unit 1122 and the interface 1120 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1100 may further include a communication or network interface 1124. Communication interface 1124 may enable computer system 1100 to communicate and interact with any combination of external devices, external networks, external entities, etc. (individually and collectively referenced by reference number 1128). For example, communication interface 1124 may allow computer system 1100 to communicate with external or remote devices 1128 over communications path 1126, which may be wired and/or wireless (or a combination thereof), and which may include any combination of LANs, WANs, the Internet, etc. Control logic and/or data may be transmitted to and from computer system 1100 via communication path 1126.

Computer system 1100 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1100 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1100 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1100, main memory 1108, secondary memory 1110, and removable storage units 1118 and 1122, as well as tangible articles of manufacture embodying any combination of the foregoing. Such control logic, when executed by one or more data processing devices (such as computer system 1100), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 11. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method comprising:
   determining a first position of a headset, configured to display and enable interactions with an interface of a computing system, is less than a threshold;
   detecting a second position of the headset;
   determining that the second position of the headset is greater than the threshold; and
   responsive to the determining that the second position of the headset is greater than the threshold, providing a menu for display in the interface visible via the headset overlaying the interface, wherein a collapsed version of the menu was visible via the headset at the first position less than the threshold.

2. The method of claim 1, wherein the threshold corresponds to a downward tilt of the headset.

3. The method of claim 1, wherein the menu was not, visible via the headset at the first position less than the threshold.

4. The method of claim 1, wherein the interface comprises a virtual reality environment, and wherein the headset is configured to detect hand motions of a user that correspond to the interactions with the interface.

5. The method of claim 1, further comprising:
   detecting a motion of the headset, wherein the motion increases a tilt of the headset and reduces a distance between a position of the headset and the threshold.

6. The method claim 5, further comprising:
   shifting the menu towards a center of the interface responsive to detecting the motion, wherein beyond the threshold, the menu is centered in the interface.

7. A computing system, comprising:
   a memory; and
   at least one processor coupled to the memory and configured to perform operations comprising:
      determining a first position of a headset, configured to display and enable interactions with an interface of the computing system, is less than a threshold;
      detecting a second position of the headset;
      determining that the second position of the headset is greater than the threshold; and
      responsive to the determining that the second position of the headset is greater than the threshold, providing a menu for display in the interface visible via the headset overlaying the interface, wherein a collapsed version of the menu was visible via the headset at the first position less than the threshold.

8. The computing system of claim 7, wherein the threshold corresponds to a downward tilt of the headset.

9. The computing system of claim 7, wherein the menu was not visible via the headset at the first position less than the threshold.

10. The computing system of claim 7, wherein the interface comprises a virtual reality environment, and wherein the headset is configured to detect hand motions of a user that correspond to the interactions with the interface.

11. The computing system of claim 7, the operations further comprising:
    detecting a motion of the headset, wherein the motion increases a tilt of the headset and reduces a distance between a position of the headset and the threshold.

12. The computing system of claim 11, the operations further comprising:
    shifting the menu towards a center of the interface responsive to detecting the motion, wherein beyond the threshold, the menu is centered in the interface.

13. A non-transitory computer-readable medium having instructions stored thereon that, when executed by at least one computing device, cause the at least one computing device to perform operations comprising:
    determining a first position of a headset, configured to display and enable interactions with an interface of a computing system, is less than a threshold;
    detecting a second position of the headset;
    determining that the second position of the headset is greater than the threshold;
    responsive to the determining that the second position of the headset is greater than the threshold, providing a menu for display in the interface visible via the headset overlaying the interface;
    detecting a motion of the headset, wherein the motion increases a tilt of the headset and reduces a distance between a position of the headset and the threshold; and
    shifting the menu towards a center of the interface responsive to detecting the motion, wherein beyond the threshold, the menu is centered in the interface.

14. The non-transitory computer-readable medium of claim 13, wherein the threshold corresponds to a downward tilt of the headset.

15. The non-transitory computer-readable medium of claim 13, wherein the menu was not visible via the headset at the first position less than the threshold.

16. The non-transitory computer-readable medium of claim 13, wherein a collapsed version of the menu was visible via the headset at the first position less than the threshold.

17. The non-transitory computer-readable medium of claim 13, wherein the interface comprises a virtual reality environment, and wherein the headset is configured to detect hand motions of a user that correspond to the interactions with the interface.

\* \* \* \* \*